(12) United States Patent  (10) Patent No.: US 9,098,173 B2
Cheng et al.  (45) Date of Patent: Aug. 4, 2015

(54) METHOD FOR SHARING NOTES OF AN ELECTRONIC BOOK AND ELECTRONIC READER THEREOF, COMPUTER READABLE STORAGE MEDIUM

(71) Applicant: WISTRON CORP., New Taipei (TW)

(72) Inventors: Yi-Hsuan Cheng, New Taipei (TW);
Meng-Jia Guo, New Taipei (TW);
Randy Lu-Hung Chang, New Taipei (TW); Hui-Ju Lin, New Taipei (TW);
Chin-Hua Chen, New Taipei (TW);
Yi-Chun Chen, New Taipei (TW);
Cheng-Yang Lai, New Taipei (TW);
Hsih-Bin Dai, New Taipei (TW)

(73) Assignee: WISTRON CORP., New Taipei (TW)

( * ) Notice: Subject to any disclaimer, the term of this patent is extended or adjusted under 35 U.S.C. 154(b) by 240 days.

(21) Appl. No.: 13/749,816

(22) Filed: Jan. 25, 2013

(65) Prior Publication Data

US 2013/0318465 A1 Nov. 28, 2013

(30) Foreign Application Priority Data

May 23, 2012 (TW) .............................. 101118339 A

(51) Int. Cl.
*G06F 3/048* (2013.01)
*G06F 3/0483* (2013.01)
*G06Q 10/10* (2012.01)

(52) U.S. Cl.
CPC ............ *G06F 3/0483* (2013.01); *G06Q 10/101* (2013.01)

(58) Field of Classification Search
CPC .......................... G06F 3/0483; G06Q 10/101
USPC .......................................... 715/776, 790, 794
See application file for complete search history.

(56) References Cited

U.S. PATENT DOCUMENTS

| | | | |
|---|---|---|---|
| 2003/0076352 A1* | 4/2003 | Uhlig et al. ................... | 345/738 |
| 2007/0271532 A1 | 11/2007 | Nguyen et al. | |
| 2009/0132907 A1* | 5/2009 | Shao et al. ..................... | 715/234 |
| 2009/0267909 A1 | 10/2009 | Chen et al. | |

(Continued)

FOREIGN PATENT DOCUMENTS

| | | |
|---|---|---|
| CN | 101882384 A | 11/2010 |
| TW | 1298842 | 7/2008 |
| TW | 201135481 A1 | 10/2011 |

OTHER PUBLICATIONS

Taiwan Patent Office, Office action issued on Jun. 12, 2014.

*Primary Examiner* — Omar Abdul-Ali
(74) *Attorney, Agent, or Firm* — Li & Cai Intellectual Property (USA) Office

(57) ABSTRACT

A method for sharing notes of an electronic book (E-book) is illustrated. The method includes steps of: comparing an identification information of a note file with a book information of the electronic book for determining whether the note file corresponds to the electronic book; receiving and transferring the note file to an electronic reader displaying the electronic book when the note file corresponds to the electronic book; stacking and displaying at least one note layer included in the note file above an electronic page of electronic book displayed on a user interface of the electronic reader, wherein the note layer includes an auxiliary annotation associated with content of the electronic page and the note layer is independent of the electronic page. Therefore, reader may read the E-book and review related annotations on the user interface at the same time, and share the note file independently to other readers.

19 Claims, 11 Drawing Sheets

(56) References Cited

U.S. PATENT DOCUMENTS

| | | |
|---|---|---|
| 2009/0271703 A1 | 10/2009 | Chu et al. |
| 2009/0271731 A1 | 10/2009 | Lin et al. |
| 2009/0271783 A1 | 10/2009 | Hsieh et al. |
| 2009/0288032 A1 | 11/2009 | Chang et al. |
| 2010/0199306 A1 | 8/2010 | Colter et al. |
| 2010/0318908 A1 | 12/2010 | Neuman et al. |
| 2010/0325527 A1* | 12/2010 | Estrada et al. ............ 715/230 |
| 2012/0030558 A1 | 2/2012 | Chiu et al. |
| 2012/0231441 A1* | 9/2012 | Parthasarathy et al. ...... 434/362 |
| 2013/0042171 A1* | 2/2013 | Yang et al. ................ 715/230 |
| 2013/0054636 A1* | 2/2013 | Tang ........................ 707/769 |

* cited by examiner

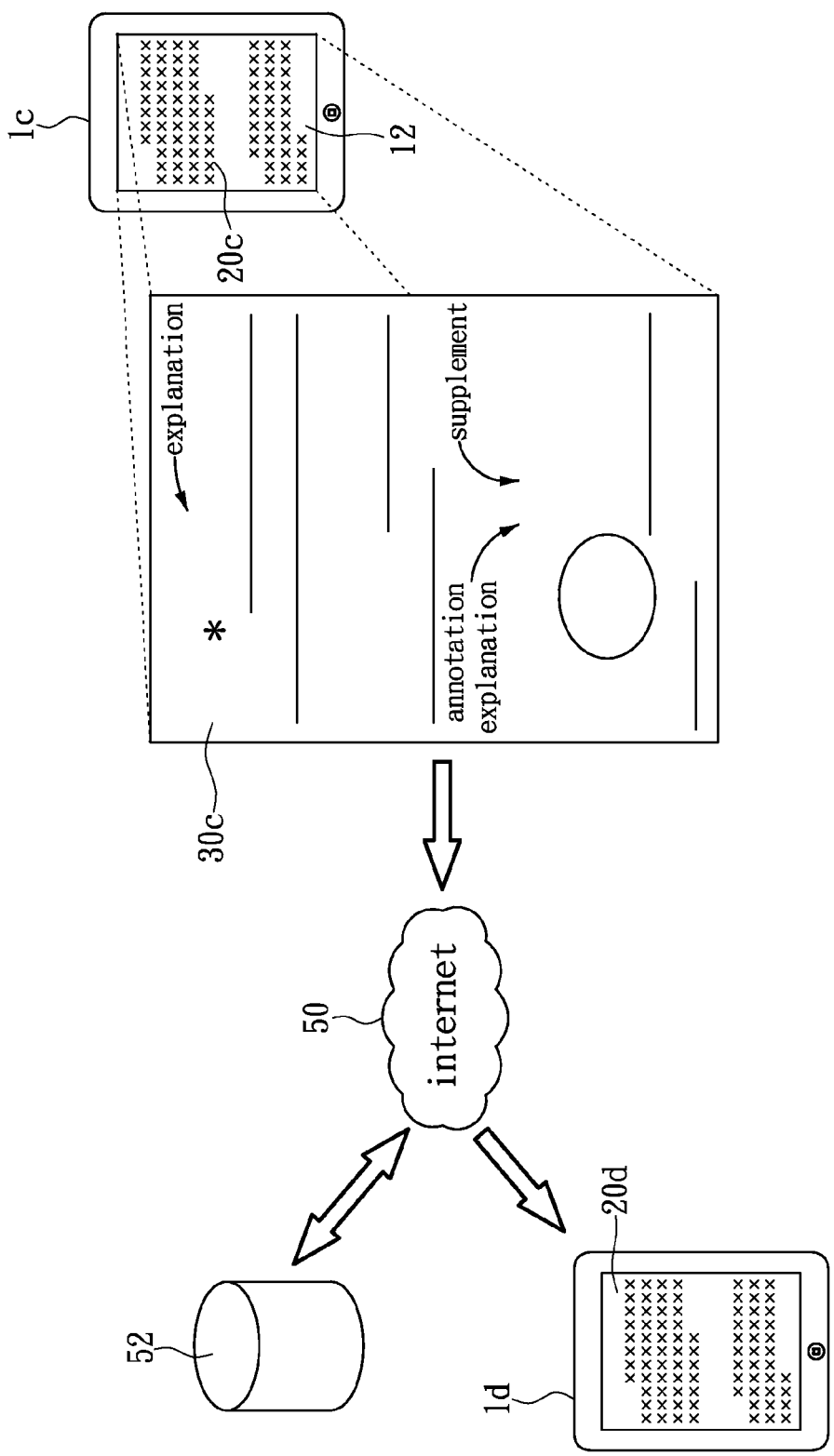

METHOD FOR SHARING NOTES OF AN ELECTRONIC BOOK AND ELECTRONIC READER THEREOF, COMPUTER READABLE STORAGE MEDIUM

BACKGROUND OF THE INVENTION

1. Field of the Invention

The present disclosure relates to an electronic apparatus and a method for sharing data; in particular, to an electronic reader and a method for sharing notes of an electronic book.

2. Description of Related Art

The development of the network and smart electronic device affect many people's reading habits, and many readers get used to electronic devices to read documents in electronic form instead of paper documents. In addition to save the space needed to store the entity book, the electronic book is liable to distribute and transfer. In order to allow the readers to be closer to the experience with reading entity book when reading the electronic book, the smart electronic devices develop the function of adding the notes on the electronic book, so that the reader will combine the feelings generated by the reading of the electronic book or important part to be marked with the electronic book through a reader.

The same electronic book, however, may be read by many different readers and each of the readers adds a different annotation, when the readers want to browse the notes of other readers by filling the contents of the same e-book, even if we already have the same electronic book, still may need to download entire electronic book merging other people's notes, and then open two electronic books merging the contents of different notes for comparing. The above approach make it complicated that the procedures for the reader to obtain different versions or the content of the notes. When reading electronic book on the reader, it is also more difficult to show a number of different notes obtained on the same electronic book at the same time.

SUMMARY OF THE INVENTION

The present disclosure provides a method for sharing notes of an electronic book (E-book). The method includes steps as follows: comparing an identification information of a note file so as to determine whether the note file corresponds to the electronic book according to a book information of the electronic book; receiving the note file and transferring the note file to an electronic reader (E-reader) displaying the electronic book when the note file corresponds to the electronic book; stacking at least one note layer included in the note file and displaying the note layer on a user interface above an electronic page (E-page) of electronic book displayed by the user interface of the electronic reader, wherein the note layer includes an auxiliary annotation associated with the content of the electronic page and the note layer is independent of the electronic page. Therefore, a reader may read the E-book and review the related annotations on the user interface at the same time, and share the note file to other readers independently.

Additionally, the present disclosure another provides an electronic reader for sharing notes of an electronic book. The electronic reader includes a storage unit, a user interface, a processing unit and a communication unit. The storage unit stores the electronic book, wherein the electronic book includes book information. The user interface displays an electronic page of the electronic book. The processing unit reads the electronic book and outputs the electronic page to the user interface according to display configuration information. The communication unit connected to the processing unit, outputs or receives a note file corresponding to the electronic book, wherein the note file includes at least one note layer and the note layer includes at least one auxiliary annotation associated with a content of the electronic page. Moreover, the processing unit compares a identification information of the note file according to the book information so as to determine whether the note file corresponds to the electronic book, and output the note layer of the note file received from the communication unit to the user interface and stack the note layer above the electronic page, wherein the note layer is independent of the electronic page.

Alternatively, the present disclosure another provides a computer readable storage medium. The computer readable storage medium stores a set of code, wherein when the set of code is read by the processing unit, the processing unit executes with the method for sharing notes of an E-book.

In summary, the method for sharing notes of an electronic book and electronic reader thereof and computer readable storage medium of the present disclosure provides the reader to exchange and share the notes added for the same content or different content of the same E-book, so as to collect a power of a plurality of note producers and then generate a rich E-book annotations.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

FIG. 3 shows a schematic diagram about another E-reader for sharing notes of the E-book according to another one embodiment of the present disclosure;

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[One Embodiment of the E-Reader]

Figure 1:
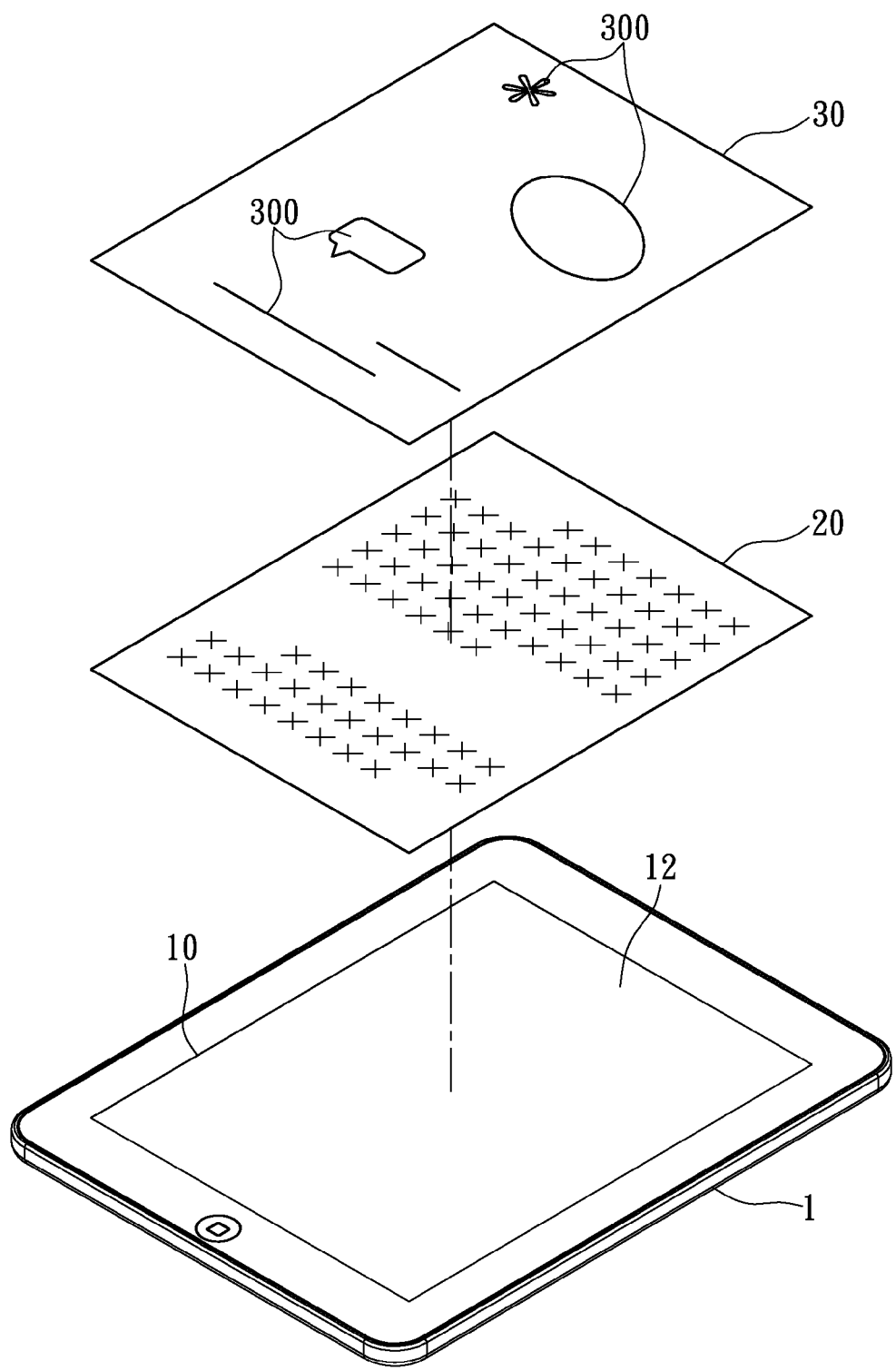
FIG. 1 shows a schematic diagram about E-reader for sharing notes of an E-book according to one embodiment of the present disclosure.

Referring to FIG. 1, FIG. 1 shows a schematic diagram about E-reader for sharing notes of an E-book according to one embodiment of the present disclosure.

The E-reader 1 may display a user interface 12 on the screen 10 so that the reader may access or operate the E-book of the E-reader 1 through the user interface 12. For example, the reader may read or browse a E-page 20 of the E-book displayed above the user interface 12 or the reader may add, edit or delete auxiliary annotation for the content of the E-page on the user interface 12. The auxiliary annotation 300 may be record on the note layer 30 that is independent of the E-page 20 of the E-book. When the E-page 20 displays above the user interface 12, the note layer 30 corresponding to the E-page 20 may stack above the E-page 20 and display together on the user interface 12. Therefore, when the reader reads the E-book through utilizing the E-reader 1, the reader may refer to the auxiliary annotation of the E-book together and then acquire supplementary information associated with the content of the E-book. The type of the auxiliary annotation can be exemplary as comment block, base line, footnote or the hand-writing track inputted by the stylus.

The E-reader 1 may be a E-book reader 1 for a special purpose, electronic paper display or a tablet computer with the reading program of the E-book, personal digital assistant (PDA) or smart mobile communication apparatus. For the convenience of the operation, the screen 10 of the E-reader 1 may be a touch-control screen. Besides being a display unit of displaying frame, the screen 10 of the E-reader 1 may also be served as an input unit of the touch-control module for providing the operation of the user.

The note layer 30 may be a virtual layer with a transparent background or translucent background so as to avoid the note layer 30, stacked above the E-page 20, sheltering the content of the E-page 20. Additionally, when the note layer is stacked above the E-page 20, the auxiliary annotation on the note layer 30 corresponds to one part or more part of content of the E-page 20 correspondingly according to the position of the auxiliary annotation 300 displaying on the note layer 30. Therefore, besides reading the content of the E-book, the reader may watch the supplementary information of one part or more part of content displaying above the E-page 20 at the same time.

Due to independent of the E-page 20 of the E-book and stacking above the E-page 20 for the note layer 30 (i.e. the auxiliary annotation 300 is not directly recorded on the E-page of the E-book), each time the reader adds, deletes or modifies the auxiliary annotation 300 on the note layer 30, the original content of the E-book do not change. Accordingly, the E-book storing in the E-reader 1 may maintain a situation that does not add any auxiliary annotation 300, and then the note layer 30 may be stored due to independent of the E-page 20 of the E-book so that the note layer 30 may come from other E-reader (not shown in FIG. 1) and may be outputted to other E-reader independently. Moreover, the reader using the E-reader may provide or acquire a plurality of supplementary information corresponding to the same E-book through the method for sharing notes of the E-book easily.

Figure 2A:
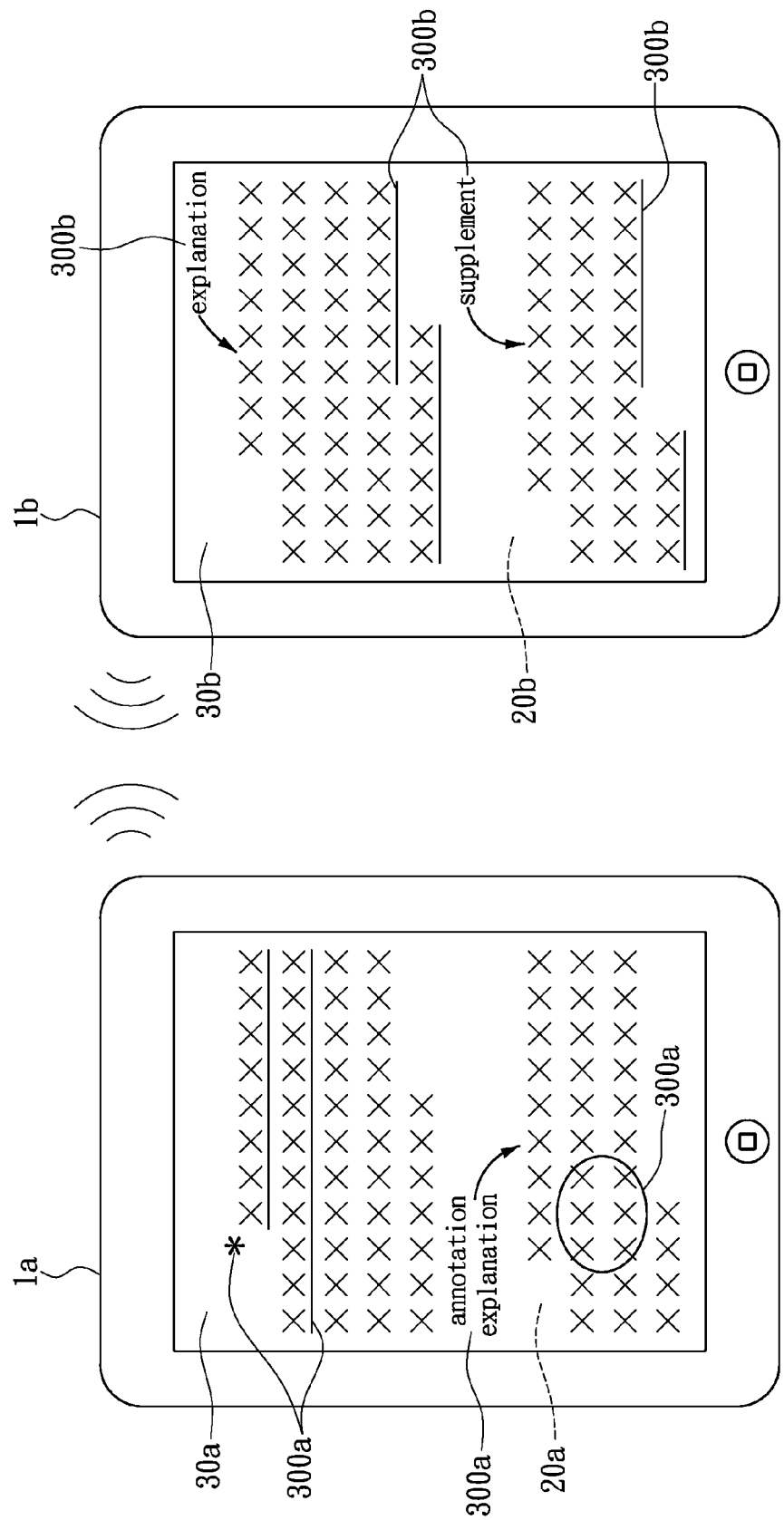
FIGS. 2A and 2B show schematic diagram about an E-reader for sharing notes of the E-book according to one embodiment of the present disclosure.
Figure 2B:
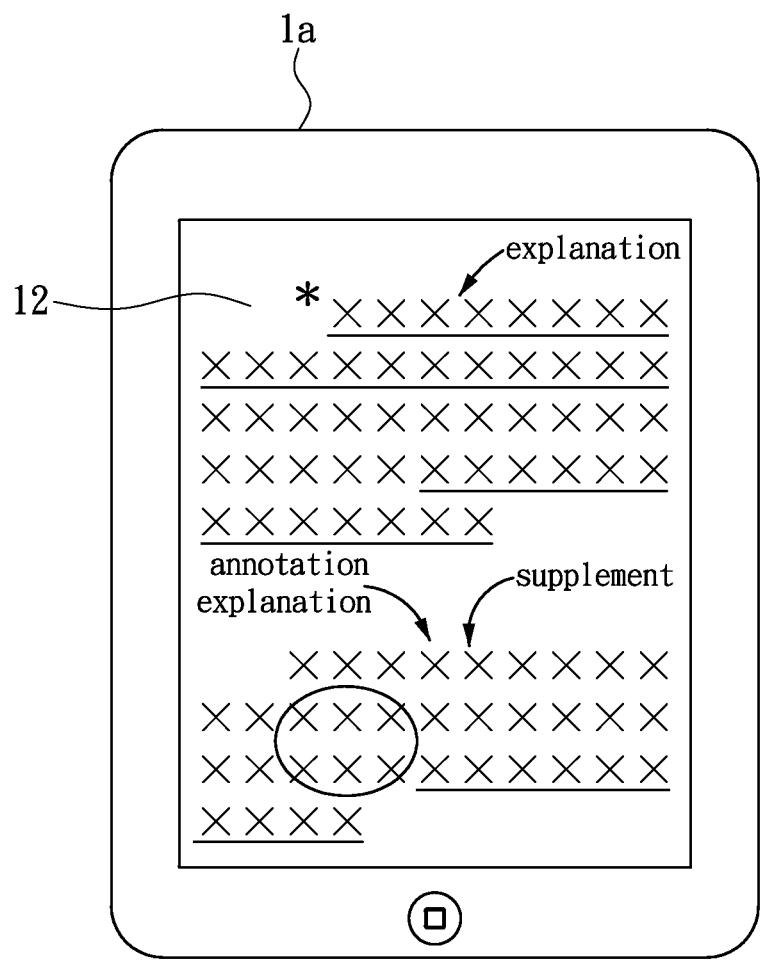

Referring to FIGS. 2A and 2B, FIGS. 2A and 2B show schematic diagram about an E-reader for sharing notes of the E-book according to one embodiment of the present disclosure.

FIG. 2A shows two E-reader 1a and 1b with the function of short-range communication, such as tablet computer. The reader using the E-reader 1a and 1b may respectively open and display the E-book for reading on the user interface of the screen, wherein the E-reader 1a also may display the note layer 30a above the E-page 20a of the user interface correspondingly and the E-reader 1b also may display the note layer 30b above the E-page 20b of the user interface correspondingly. The note layer 30a records a plurality of auxiliary annotations 300a which is corresponding to the content of the E-page 20a, similarly, the note layer 30b records a plurality of auxiliary annotations 300b which is corresponding to the content of the E-page 20b. The note layer 30a and 30b may be respectively generated above the E-reader 1a and 1b for the reader of the E-reader 1a and 1b and may receive notes produced by other E-reader (not shown in FIG. 2A).

When the E-page 2a and 2Fb are the same page of the E-reader 20a and 20b, the two E-reader 1a and 1b may utilize short-range communication technology to transmit and receive the note layer 30a and 30b so as to acquire additional information. In other words, the E-reader 1a may be connected to the E-reader 1b contiguously or non-contiguously and receive the note layer 30b so that when the reader using the E-reader 1a reads E-page 20a, the reader not only watch the auxiliary annotation 300a of the note layer 30a stacked above the E-page 20a, but also watch the auxiliary annotation 300b of the note layer 30b stacked above the E-page 20a, as shown in the user interface of FIG. 2B. Similarly, The E-reader 1b may also utilize the same means to receive the note layer 30a and then the reader using the E-reader 1b may watch the original auxiliary annotation 300b of the note layer 30b and auxiliary annotation 300a of the note layer 30a coming form the E-reader 1a above the E-page 20b at the same time, as shown in FIG. 2B.

[Another One Embodiment of the E-Reader]

Referring to FIG. 3, FIG. 3 shows a schematic diagram about another E-reader for sharing notes of the E-book according to another one embodiment of the present disclosure. The E-reader 1c has a network communication unit (not shown in FIG. 3) with the function of connecting the internet 50, such as network interface card or wireless network module chip, and the E-reader 1c may display the E-page 20c of the E-book stored in the itself and display the note layer 30c stacked above the E-page, on the user interface 12. The note layer 30c may be transmitted from the E-reader 1c to the internet 50 through the communication unit and be stored in the far-end network database 52 for downloading.

Another E-reader 1d storing the same E-book also has the communication unit (not shown in FIG. 3) with the function of connecting the internet 50 and may display the E-page 20d of the E-book on the user interface. When the E-book with the E-page 20d is the same as the E-book corresponding to the note layer 30c storing in the network database 52, the E-reader 1d is connected to the network database 52 through the communication unit and compares the E-book storing in the E-reader 1d with the E-book corresponding to the note layer 30c, and then the note layer 30c is downloaded in the E-reader 1d from the network database 52 after the E-book storing in the E-reader 1d fitting in with the E-book corresponding to the note layer 30c.

Accordingly, when the reader using the E-reader 1d opens the E-book and the E-page 20d is displayed on the user interface, the note layer 30c provided by the E-reader 1c is also displayed on the user interface and stacked above the E-page 20d for providing the reader additional supplementary information.

[Another Embodiment of the E-Reader]

Figure 4:
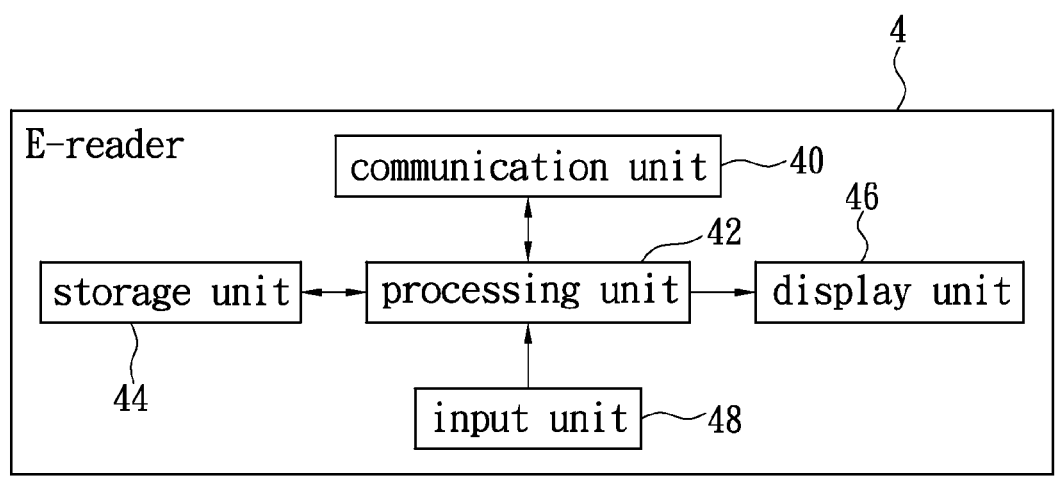
FIG. 4 shows a block diagram of an E-reader according to another embodiment of the present disclosure.

Next, referring to FIG. 4, FIG. 4 shows a block diagram of an E-reader according to another embodiment of the present disclosure. FIG. 4 is for illustrating one means of the E-reader for sharing notes of the E-book.

The E-reader 4 may be an aforementioned exemplary E-book reader, a tablet computer or other smart electronic apparatus, wherein the E-reader 4 includes a communication unit 40, a processing unit 42, a storage unit 44, a display unit 46 and an input unit 48. The communication unit 40, the storage unit 44, the display unit 44 and the input unit 48 are connected to the processing unit 42 respectively so as to be controlled by the processing unit 42.

The communication unit 40 may be a short-range communication module chip with function of short-range communication, such as near filed communication (NFC) module, radio frequency identification (RFID) module or Bluetooth module. Due to feature with easy setting and connecting for NFC technology, the present embodiment takes NFC module chip as an example for explanation. The processing unit 42 may be a main operating core in the E-reader 4, such as central processing unit (CPU), embedded controller (EC) or digital signal processor, and also the processing unit 42 may be an application-specific integrated circuit (ASIC) or a field-programmable gate array (FPGA) in purpose of processing the note-sharing of the E-book.

The storage unit 44 is used for store the E-book and a note file coming from the reader's editing or other E-reader. The storage unit 44 may be a non-volatile memory (NVM), such as flash, programmable read-only memory. The display unit 46 is for providing the user interface so as to display the E-page of the E-book and related notes. The input unit 48 is for providing the reader to operate so as to generate and control the E-book and/or notes on the user interface. The display unit 46 and the input unit 48 may be integrated as a touch-control screen with a touch-control panel.

In the present embodiment, each book not only has a plurality of E-pages for recording words, pictures or contents, but also has the book information for identifying the E-book, such as book name, author, publisher, international standard book number (ISBN), publication place, publication date or user-defined label. The book information and the E-page of the E-book both store in the storage unit 44. When the processing unit 42 reads the E-book from the storage unit 44 and transmits the E-book to the user interface of the display unit 46 for displaying, the processing unit 42 may adjust a display mode of the E-page for adapting to a display configuration information according to the display configuration information of the user interface on the display unit 46. The display configuration information includes an aspect proportion and a resolution. For example, the processing unit 42 may adjust the number of column or row of each E-page, or adjust maximum number of words included in each row or each column according to the aspect proportion so as to display the content of the E-page on the user interface completely and averagely. Therefore, the typesetting of the same E-book may be a little different on the user interface of the E-reader with different display configuration information.

Relatively speaking, the note file that the reader produces or the note file acquired from other E-reader both also may include the identification information. The identification information may include the content of the E-book corresponding to one or more note file so as to determine the correlation between the specific E-book and the note file that independent of the E-book. Thus, it may avoid the problem that the note layer of the note file corresponds to not-relevant E-book so as to cause the mismatch between the auxiliary annotation and the E-page.

The identification information of the note file may include book name, author, publisher, international standard book number (ISBN), publication place, publication date or user-defined label corresponding to the E-book. In other words, the identification information of the note file may include part or all of the book information corresponds to the E-book. In more detail, each note layer of the note file may further include number of page or number of paragraph corresponds to the E-page, so that when the processing unit 42 outputs the note layer to the user interface, the note layer may be stacked above the E-page correctly. Furthermore, each note layer still includes the size information, such as original aspect proportion and aspect size, and resolution of the note layer.

When the E-reader 4 opens the E-book on the user interface and receives the note file corresponding to the E-book opened from another E-reader (not shown in FIG. 4), the communication unit 40 with the function of short-range communication may receive the identification information of the note file stored in the another E-reader due to the E-reader's approach. Specifically, taking the NFC technology as an example, when the two E-reader close to each other until the range the NFC transmission protocol can work or contact each other, the NFC module chip may receive the identification information of the note file and transmit the identification information of the note file to the processing unit for comparing and determining. When the processing unit 42 compares the identification information of the note file with the book information of the E-book which is displaying, the note file is determined to corresponds to the E-book while all item of the identification information fit in with the book information according to the design; the note file is determined to corresponds to the E-book while part of item of the identification information fit in with the book information. For example, the book information includes five items related to the E-book, when three items of the identification information fit in with the three item of the book information (e.g. book name, author, ISBN), the processing unit 42 determines that the note layer corresponding to the identification information received by the communication unit 40 includes the related note layer of the E-book on the user interface, and then further receives the note file and stores the note file in the storage unit 44 through the communication unit 40.

The size information of each note layer received and stored in the storage unit 44 may not fit in with the display configuration information of the E-reader 4. For example, after receiving the display configuration information of the E-reader 4, the aspect proportion of the note layer changes from the original aspect proportion of sixteen to nine to the aspect proportion of four to three. Therefore, if not adjusting the display size of the note layer cooperated with the display configuration information, it may cause problem like that the auxiliary annotation can not correspond to the content correctly and provide the reader effective information. Therefore, before the processing unit 42 outputs the note layer to the user interface, the processing unit 42 compares the size information of the note layer with the display configuration information and adjusts the size and the aspect proportion of layer properly according to the proportion between the size information of the note layer and the display configuration information. For example, endpoint coordinates of the layer and endpoint coordinates of the user interface both are utilized for calculating with the proportion, in other words, the two endpoint coordinates located on two end of the diagonal on the layer and the two endpoint coordinates located on two end of the diagonal on the user interface both are utilized for calculating with proportion, and thus the auxiliary annotation of the note layer may change the display position according to the number of row, the number of column or the alignment mode on the user interface so as to correspond to the content of the E-page correctly.

When the communication unit 40 provides short-range communication, the E-reader 4 shown in the embodiment of FIG. 4 may be implemented with the E-reader 1a and 1b shown in FIG. 2A, so as to achieve the effect of sharing the notes of the E-book without passing the internet. Relatively, when the communication unit 40 provides the service of connecting the internet, the E-reader 4 shown in FIG. 4 may also be implemented with the E-reader 1c and 1d shown in FIG. 3, so as to transmit or receive the notes of the E-book through the internet respectively.

It is worth mentioning that the note file received by the E-reader 4 may include a plurality of note layers. The plurality of note layers may be a collected note layer coming from the same E-reader or different E-reader after several sharing. Moreover, the plurality of note layers may respectively correspond to the same E-page or different E-page of the same E-book. When the same E-page has the plurality of note layers correspondingly, the same content of the E-book may respectively be recorded as the auxiliary annotations by the different note layers.

Figure 5A:
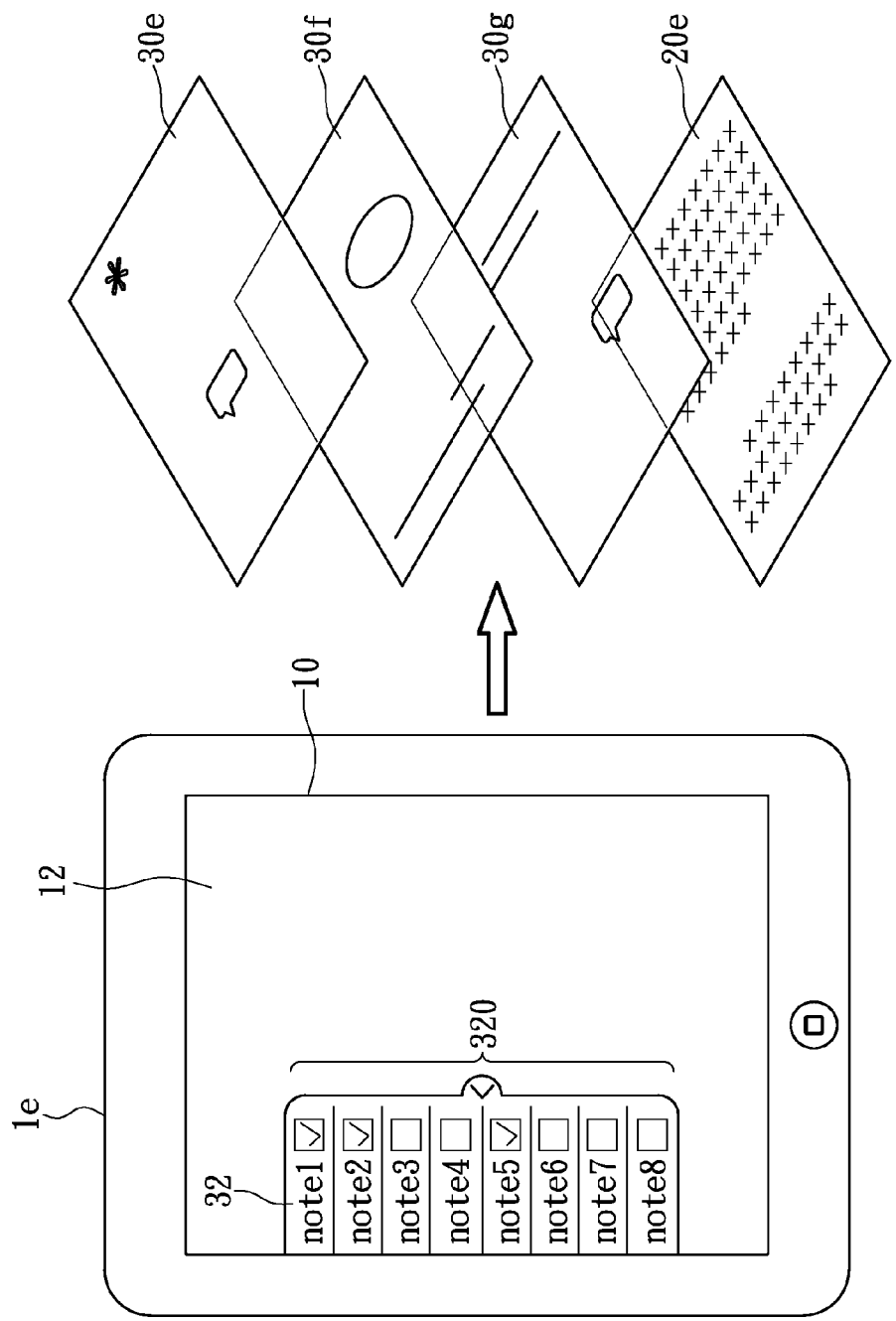
FIGS. 5A and 5B shows a schematic diagram of the E-reader displaying a plurality of note layers, according to one embodiment of the instant disclosure.

Referring to FIGS. 4 and 5A, the FIG. 5A shows a schematic diagram of the E-reader according one embodiment of the instant disclosure. When the plurality of note layers received corresponds to the same E-page 20e, the processing unit 42 may generate a note list 32 and display the note list 32 on the user interface 12. The note list 32 may be listed the identification name 320 of all note layers corresponding to E-page 20e or the information of the plurality of note layers for identifying, so as that the reader may choose one or more identification name through the note list 32 and the processing unit 42 may read and sequentially stack one or more note layers on the user interface 12 according to identification name correspondingly.

Figure 5B:
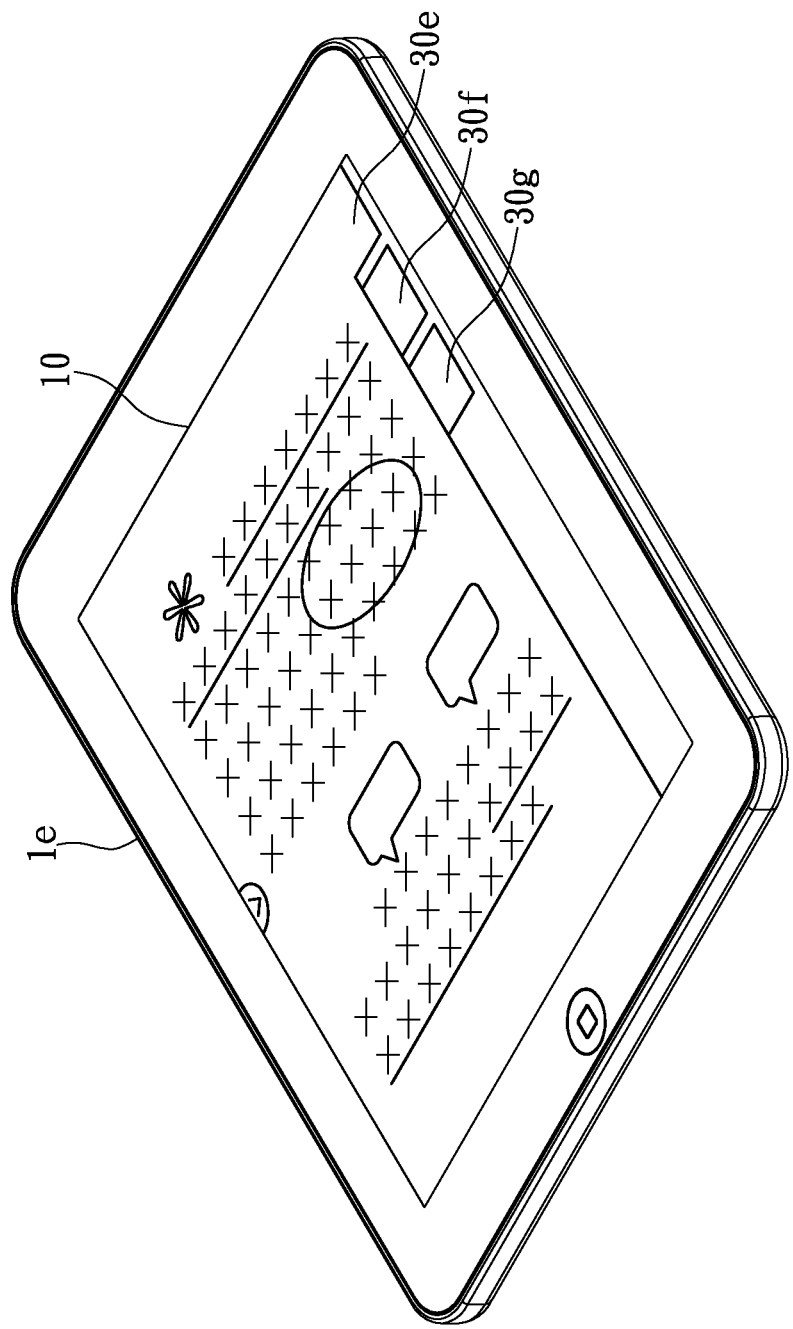

As shown in FIG. 5A, the processing unit 42 generates and outputs the note list 32 to the user interface 12, and displays the note list 32 on upper layer of the E-page, and then the reader may click the identification name 320 of the note list 32 once or in multiple so as to generate the command. For example, the note 1, 2 and 5 are chosen in FIG. 5A, after the processing unit 42 (referring to FIG. 4) reads the note layers corresponding to the note 1, 2 and 5 respectively, the note list 32 may be hidden or closed in the edge of the user interface 12 and the note layers 30e, 30f and 30g with different auxiliary annotation may be stacked above the E-page 20e that is displayed on the user interface 12. Therefore, as shown in FIG. 5B, the reader may watch the content of the E-page 20e and the auxiliary annotations of the note layers 30e~30f recording for the E-page 20e.

The note layer may be a transparent layer or translucent layer, such as vector graphic object layer according to XML standard, so as that when multiple layer stack above the E-page, the content of the E-page still display on the user interface without being sheltered. When the reader want to view other auxiliary annotation of the note layer, the reader may pull out the note list 32 through the touch-control screen 10 and select again the identification name of the note layer that is to be displayed or hidden so as to process for the processing unit 40 according to the input command of the user.

Specially speaking, the E-page 20e and the note layers 30e~30g shown in FIG. 5A are the virtual layers generated and displayed on the user interface 12 according to the operation and the drawing of hardware components in the E-reader 1e. The present embodiment is only for ease of explanation and viewing, and thus the E-page 20e and the note layers 30e~30g shown in FIG. 5A are drawn outside the E-reader 1e. Additionally, the stacking sequences of the note layer 30e~30g as shown in FIG. 5A are not limited.

Figure 6B:
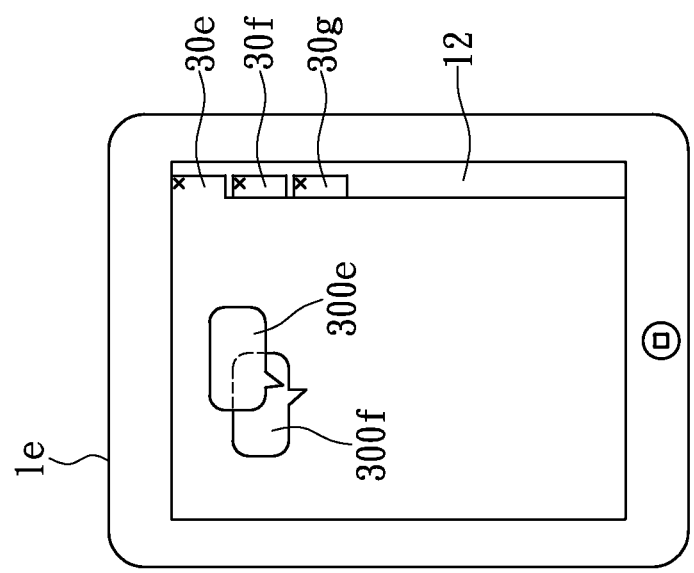
FIGS. 6A and 6B shows a schematic diagram of the E-reader adjusting a plurality of the auxiliary annotation according one embodiment of the instant disclosure.
Figure 6A:
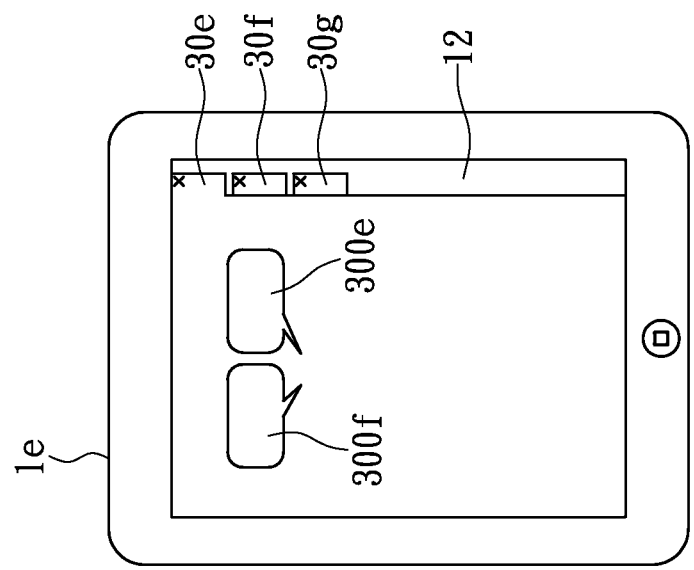

In more detail, when the note layers 30e~30g display on the user interface 12, E-reader still may permit the reader to adjust or edit the note layers 30e~30g displayed. Please refer to the E-reader 1e shown in FIG. 6A, the sequence of the note layers stacked above the E-page 20e is 30e~30g from up to bottom. In other words, the note layer 30e is located on the top-level. If the content of one auxiliary annotation 300e of the note layer 30e is just corresponding to the same content of the auxiliary annotation 300f of the note layer 30f so as to overlap, the auxiliary annotation 300f located on bottom-level may be sheltered so as to not be identified through the user interface 12. The E-reader 1e may permit the reader to edit or modify the note layer 30e located on the top-level. For example, the reader may move the display position of the auxiliary annotation 300e so as that the display position of the user interface 12 does not overlap the auxiliary annotation 300f, as shown in FIG. 6B. Because the auxiliary annotation is associated with start end point of the specific content of the E-page 20e while adding each auxiliary annotation, the reader still may get the corresponding content of the auxiliary annotation 300e through the correlation between the auxiliary annotation 300e and start end point of the content.

Besides moving the display position of the auxiliary annotation, the E-reader 1e still permit the reader to operate the note layer 30e located on the top-level through the screen 10. For example, the reader may drag the edge of the note layer 30e on the user interface 12 so as to scale the display size of the note layer 30e, start the function of editing or click the closing item of the note layer 30e for hiding the note layer 30e. In addition, the E-reader 1e also may permit the reader to change the note layer displayed on the top-level through the screen 10, so as to adjust or edit the note layer displayed on the top-level. For example, the processing unit 42 may display each page-tag of the note layer 30e~30g without overlapping on the side of the user interface 12, so as that the reader may switch different note layer to the top-level with the means of selecting page-tag.

The content of the E-page 20e and the note layers 30e~30g displayed on the user interface 12 as shown in FIGS. 5A~5B and FIGS. 6A~6B is nothing but exemplary embodiment, the processing unit 42 may get each of the note layers displayed on the user interface 12 and stacked above the E-page 20e of the E-book with different way of displaying according to different design

[Embodiment of Method for Sharing Notes of the E-Book]

Figure 7:
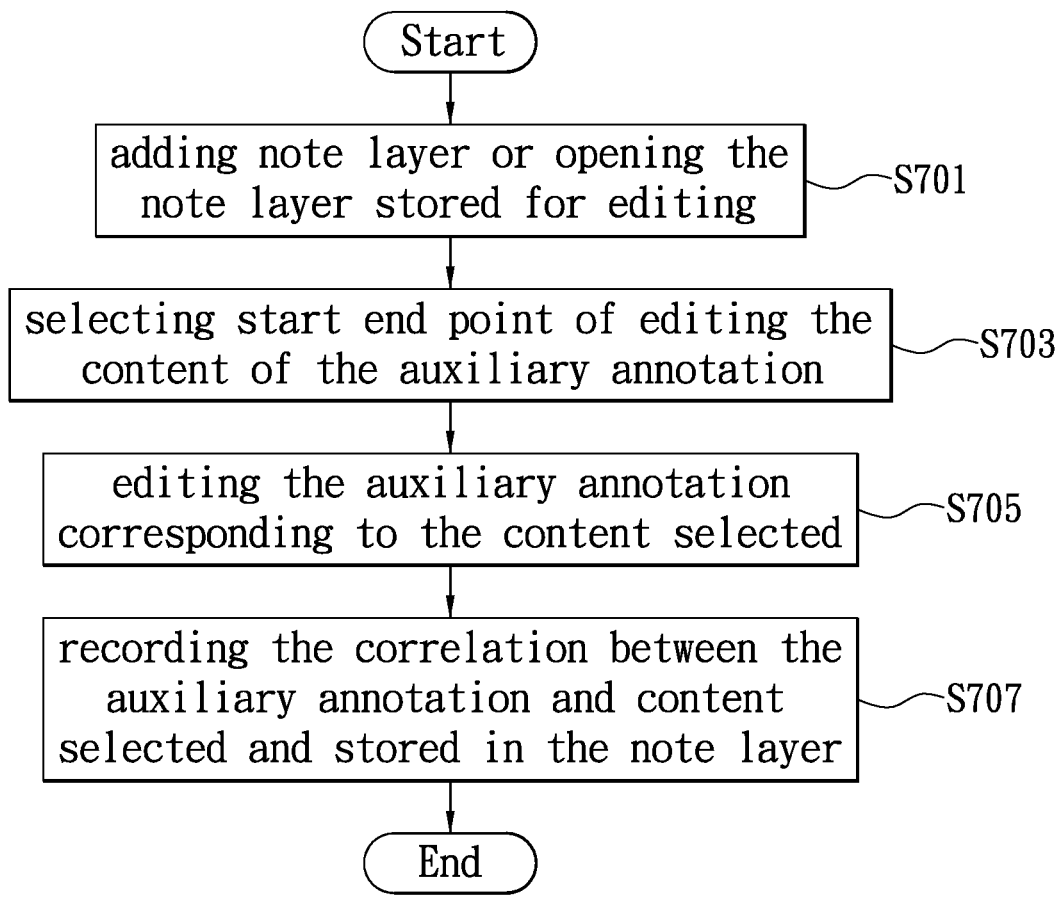
FIG. 7 shows a flow diagram of adding notes for the E-book according to one embodiment of instant disclosure.

Next, an embodiment of the method for sharing notes of the E-book is provided. FIG. 7 shows a flow diagram of adding notes for the E-book according to one embodiment of instant disclosure, Please refer to FIG. 7 cooperated with FIG. 4, for understanding the correlation of the E-book and the corresponding note thereof before explaining the method for sharing notes of the E-book.

Firstly, the reader may add a blank note layer on the E-reader 4 displaying the E-page of the E-book or open a note layer which is corresponding to the E-page and storing in the storage unit 44, and then the reader may record the book information of the E-book in the note layer (step S701), wherein the note layer is independent of the E-page and stacked above the E-page. The processing unit 42 may identifying the start end point of the part content selected by the reader through the input unit 48 on the user interface (step S703), wherein the start end point of the content selected is the where the reader want to add the auxiliary annotations. After identifying the content selected, the processing unit 42 further receives the auxiliary annotations inputted or modified by the reader through the input unit 48 (step S705), such as the auxiliary annotation with adding, modifying, or deleting the hand-writing words, comment block words, baseline or footnote. After the completion of editing, the processing unit 42 further get the auxiliary annotations which is added or modified according to indication of the reader, stored in the note layer added or opened as shown in step S701, and then get the start end point of content selected correlated with the auxiliary annotation edited. Therefore, the note layer, newly-added or updated through editing, may corresponds to the specific content of the specific E-page of the specific E-book.

Figure 8:
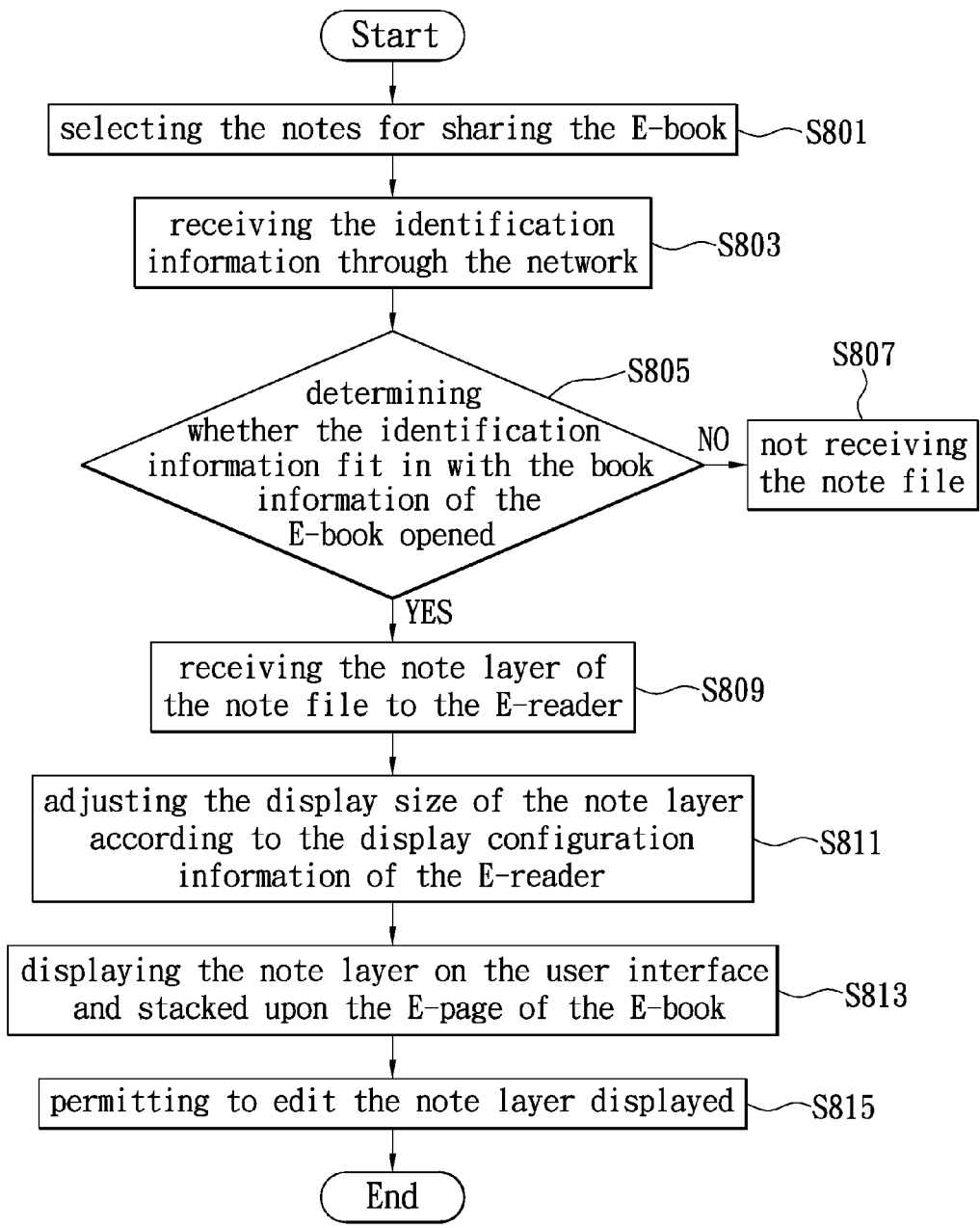
FIG. 8 shows a flow diagram of method for sharing notes of the E-book according to one embodiment of instant disclosure.

After understanding the correlations among the note layer, auxiliary annotations and the E-book, please refer to FIG. 8 with FIG. 3, FIG. 8 shows a flow diagram of the method for sharing notes of the E-book according to one embodiment of the instant disclosure.

When the reader opens and reads one E-book on the E-reader 1*c*, the reader may share the note of the E-book that is opening in the reading mode (step S801). For example, the options provided by the application program of the E-book is used for transmitting the note layer of the E-book, that is opening, or receiving the note layer of the same E-book from other E-reader. In the embodiment, the note layer 30*c* corresponding to each E-page of the E-book may be outputted from the E-reader 1*c* and stored in the network database 52 through the transmitting of the internet 50.

When another E-reader 1*d* select the notes of the E-book for sharing as shown in step S801, the reader may firstly search and receive the identification information of the note file stored in the network database 52 through the internet 50 (step S803), so as to confirm that the note file, that will soon be downloaded, corresponds the E-book opened in the E-reader 1*d*. The E-reader may compare the book information of the E-book opened with identification information received through the internet, and determine whether book information corresponds to at least one part or all of the book information (step S805). For example, the identification information and the book information both includes five items associated with the E-book respectively, and each item of the identification information fits in with three or all items of the book information correspondingly.

If the identification information received by the E-reader 1*d* does not fit in with the book information of the E-book, the E-reader 1*d* does not continuously receive the note file corresponding to the identification information (step S807). Relatively, after the determination in the step S805, if the item of the identification information fits in with the item of the book information, the note layer of the note file corresponding to the identification information will be received by the E-reader 1*d*, and then compares the size information of the note layer 30*c* and the display configuration information of the, E-reader 1*d*, and thus adjusts the display size of the note layer 30*c*, such as the aspect proportion and the resolution, according to the proportion so as to fit in with the display configuration information (step S811).

When the display size of the note layer 30*c* completes adjusting according to the display configuration information, the note layer 30*c* of the E-book opened may be displayed on the user interface of the E-reader 1*d* and stacked above the E-page 20*d* of the E-book (step S813), so as that the reader may browse the auxiliary annotation recorded in the note layer 30*c*, and the reader are permitted to edit the note layer 30*c* in order to add or delete the auxiliary annotation without changing the content of the E-page (step S815).

[Another One Embodiment of Method for Sharing Notes of the E-Book]

Figure 9:
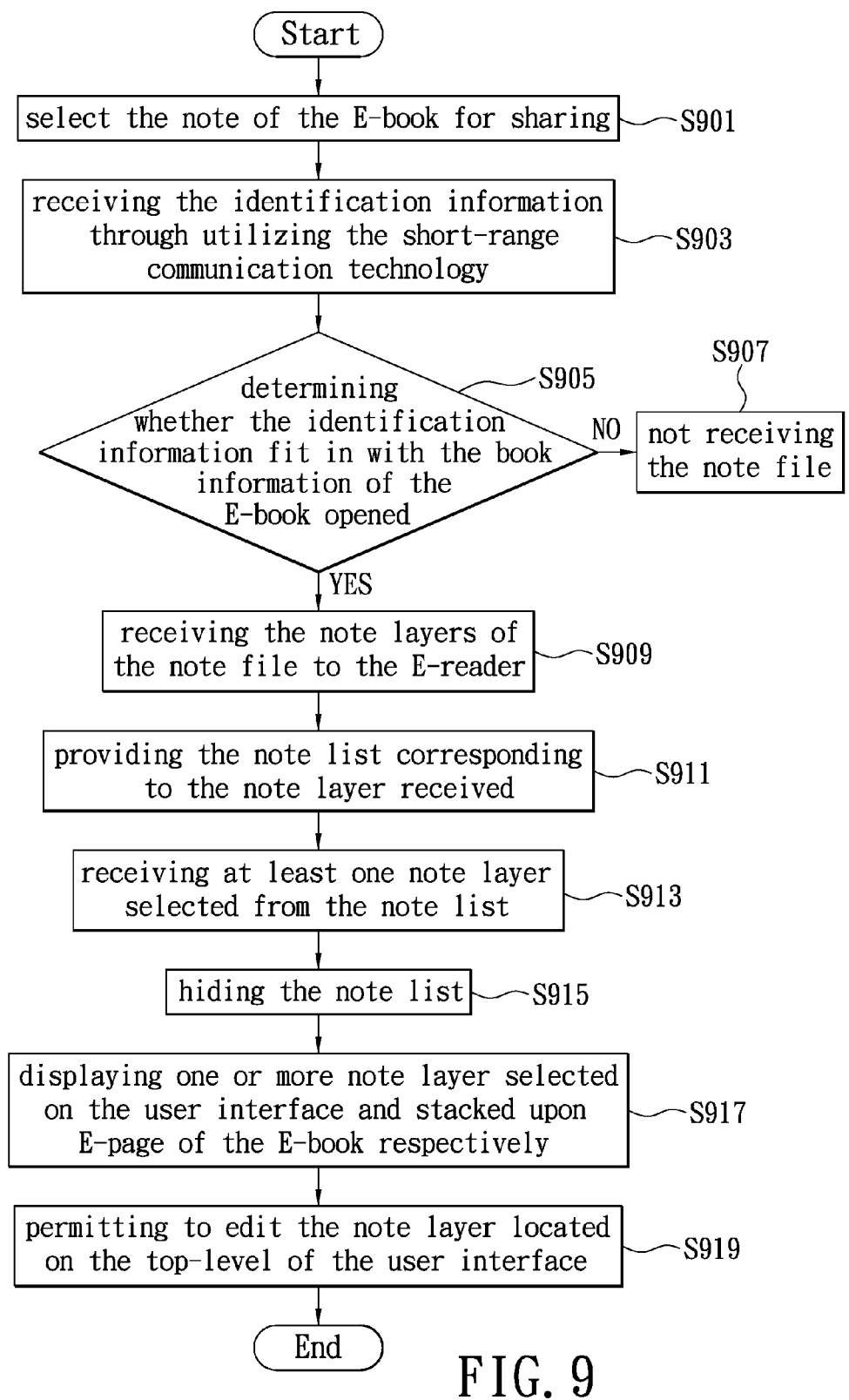
FIG. 9 shows a flow diagram of method for sharing notes of the E-book according to one embodiment of instant disclosure

Next, please refer to FIG. 9 with FIG. 5A, FIG. 9 shows a flow diagram of method for sharing notes of the E-book according to another embodiment of the instant disclosure.

In the embodiment, the reader may open an E-book in the E-reader 1*e*, and when the E-page 20*e* is displayed on the user interface 12, the reader may select the notes of the E-book for sharing (step S901). When starting the options for sharing the notes, the E-reader 1*e* may receive the identification information of the note file of the E-book near through short-range communication technology (e.g. near field communication), and the identification information of the note file is stored in the other E-reader near, such as E-reader 1*e*.

The processing unit (not shown in FIG. 5A) of the E-reader 1*e* may compare the book information of the E-book with the identification information received, so as to determine whether the note file corresponding to the identification information fir in with the book information of the E-book opening (step S905). If the identification information of the note file does not fit in with the book information, the processing unit determines that the note file does not correspond to the E-book opening and then stop receiving the identification information. In other hand, if the comparison results of the identification information and the book information determine that another E-reader has the note file stored in the E-reader 1*e*, the E-reader 1*e* may further receive the note file and the note layer through utilizing short-range communication (step S909).

After receiving the note file, the processing unit of the E-reader may generate the note list 32 and display the note list 32 on the user interface 12 according to the identification name 320 of a plurality of note layer of the note file (step S911). For example, when the note file includes a plurality of note layer used for supplying the same E-page 20*e*, the processing unit may utilize the note list 32 to display the identification name 320 (the note 1~7 as shown in FIG. 5A) so as to browse and select for the reader, and then the processing unit may receive the command that select one or more note layers from the note list 32 for reader so as to determine displaying the note layer on the user interface 32 (step S913).

After determining the note layer selected to be displaying (the note 1, 2 and 5 as shown in FIG. 5), the processing unit may firstly hide the note list 32 (step S915). For example, the note list 32 is closed to the side of the user interface, and then the plurality of note layer 30*e*, 30*f* and 30*g* are read and displayed on the user interface 12, afterwards, the plurality of note layer 30*e*, 30*f* and 30*g* are stacked on top-level of the E-page independently (step S917). The plurality of note layer 30*e*, 30*f* and 30*g* are independent each other, and even though the plurality of note layer 30*e*, 30*f* and 30*g* may change the stacking sequences each other. Therefore, the reader may read the content of the E-book including the auxiliary annotations of three different note layer on the screen 10 of the E-reader 1*e* (referring to FIG. 5B). It is worth noted that before each of the plurality of note layers display on the user interface 12, the processing unit may firstly compare each size information with the display configuration information of the E-reader 1*e* and adjust, so as that each of the plurality of note layers all fit in with the display configuration information, and then be outputted to the user interface 12, and thus correctly correspond to the content of the E-page 20*e* associated with the auxiliary annotations.

When a plurality of note layer are stacked above the E-page 20*e* and are displayed on the user interface 12 of the screen 10, the E-reader 1*e* permits the reader to adjust and edit the note layer (30*e* as shown in FIG. 5A) located on the top-level displaying on the user interface 12 through the input unit (e.g. the touch-control module of the screen 10) (step S919). For example, scaling the display size of the note layer 30e, moving the display position of the auxiliary annotation of the note layer 30e on the note layer 30e so as to avoid the overlap of the auxiliary annotation, adding the auxiliary annotations in the note layer 30e or hiding the note layer 30e.

When the reader wants to edit or adjust different note layer, the reader may change the stacking sequence of the note layers so as to change the note layer located on the top-level. For example, the reader may close the note layer 30e so that the note layer 30f will be displayed on the top-level, or each page-tag of the note layers display on the user interface 12, so that the reader may switch different note layers to the top-level by the means of clicking the page-tag.

Accordingly, the reader may view a plurality of auxiliary annotation recorded in the different note layers at the same time, so as to get more supplementary information related to the content of the E-book that the reader reads.

To sum up, according to the embodiments of the instant disclosure, the aforementioned method for sharing notes of the E-book and E-reader thereof, computer readable storage medium not only provide the reader of the E-book to get other notes related to the same E-book through the internet or a way of closing to each other after the verification of the note information to E-book, but also provide a user interface that may display the notes depend on the reader's demand flexibly.

The reader of the E-reader may selectively display one note or the multiple notes together with the E-book at the same time depend on the demand of the reader at will, and then respectively stack above the E-page of the E-book, and thus the E-reader may display the content of the E-page completely and the reader may view the supplementary information provided by the content of noes, and again edit or modify the content of notes.

Additionally, the note layers of the embodiments may adapted to the display configuration of a variety of the E-reader, and correspondingly adjust the proportion and the resolution of the note layer when the note layer displays. Thus, even though the note layer comes from the E-reader with different display size or display proportion, the reader may browse the auxiliary annotations corresponding to the content of the E-book correctly on the user interface.

Furthermore, because the note layers of the embodiments is a transparent layer or translucent layer that is independent of the E-book and the auxiliary annotations dose not merge with the file of the E-book, even though the auxiliary annotations recorded on the note layers is modified, the E-book itself does not change. Therefore, according to above-mentioned, after the reader shares the E-book without auxiliary annotations to other reader, other reader may freely receive one or more note of the E-book from other reader of the E-book, so as to achieve the sharing of knowledge.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for sharing notes of an electronic book, comprising:
    comparing an identification information of a note file so as to determine whether the note file corresponds to the electronic book according to a book information of the electronic book;
    receiving the note file and transferring the note file to an electronic reader displaying the electronic book when the note file corresponds to the electronic book; and
    stacking at least one note layer included in the note file above an electronic page of the electronic book which is displayed on a user interface of the electronic reader, and displaying the stacked note layer on the user interface,
    wherein the note layer includes at least one auxiliary annotation associated with content of the electronic page and the note layer is independent of the electronic page;
    wherein the step of stacking at least one note layer included in the note file and displaying the note layer above the electronic page of the electronic book comprises:
        stacking a plurality of not layers above the electronic page sequentially when having the plurality of note layers displayed on the electronic reader,
        wherein each of the plurality of the note layers is independent of the electronic page and each of the plurality of the note layers is independent of each other.

2. The method according to claim 1, wherein after receiving the note file to the electronic reader further comprises:
    displaying a note list when the note file includes the plurality of note layers, wherein the note list includes an identification name of each of the plurality of note layers;
    indentifying at least one of the identification name selected from the note list and displaying the note layer corresponding to the selected identification name; and
    hiding the note list.

3. The method according to claim 1, after stacking at least one note layer included in the note file and displaying the note layer above the electronic page of the electronic book further comprising:
    controlling a display mode of the note layer stacking on the top of the plurality of the note layers.

4. The method according to claim 3, wherein controlling the display mode Of the note layer stacking on the top of the plurality of the note layers comprises scaling a display size of the note layer, moving a display position of the auxiliary annotation in the note layer; adding a new auxiliary annotation in the note layer, or hiding the note layer.

5. The method according to claim 1, before stacking at least one note layer included in the note file and displaying the note layer above the electronic page of the electronic book further comprising:
    reading a size information of the note layer and a display configuration information of the electronic page; and
    proportionally adjusting the note layer according to a result of the comparison between the size information and the display configuration so as to make the display size of the note layer fit in with the display configuration information.

6. The method according to claim 5, wherein the size information includes an aspect proportion and a resolution of the note layer and the display configuration information includes an aspect proportion and a resolution of the electronic reader.

7. The method according to claim 5, wherein the step of adjusting the note layer on the basis of proportion so as to make the display size of the note layer fit in with the display configuration information according to the size information comprises:
  acquiring endpoint coordinates of a plurality of endpoints of the note layer according to the size information;
  acquiring endpoint coordinates of a plurality of endpoints of the electronic page according to the display configuration information; and
  calculating proportion for scaling the note layer so that the note layer fits in with the display configuration information according to the endpoint coordinates of the plurality of endpoints of the note layer and the endpoint coordinates of the plurality of endpoints of the electronic page.

8. The method according to claim 6, wherein the step of adjusting the note layer on the basis of proportion so as to make the display size of the note layer fit in with the display configuration information according to the size information comprises:
  acquiring endpoint coordinates of a plurality of endpoints of the note layer according to the size information;
  acquiring endpoint coordinates of a plurality of endpoints of the electronic page according to the display configuration information; and
  calculating proportion for scaling the note layer so that the note layer fits in with the display configuration information according to the endpoint coordinates of the plurality of endpoints of the note layer and the endpoint coordinates of the plurality of endpoints of the electronic page.

9. The method according to claim 1, wherein the step of comparing the identification information of the note file according to the book information of the electronic book comprises:
  comparing a plurality of book items with a first amount included in the book information with a plurality of identification items included in the identification information; and
  determining that the note file corresponds to the electronic book when the plurality of identification items with a second amount fit in with the book items included in the book information,
  wherein both the first amount and the second amount are larger than one and the first amount is larger than or equal to the second amount.

10. The method according to claim 1, wherein when the note file corresponds to the electronic book, receiving the note file from far-end through a network communication unit or receiving the note file from another electronic reader through a short-range communication unit.

11. An electronic reader for sharing notes of an electronic book, comprising:
  a storage unit, for storing the electronic book, wherein the electronic book includes a book information;
  a user interface, for displaying an electronic page of the electronic book;
  a processing unit, reading the electronic book and outputting the electronic page to the user interface according to a display configuration information; and
  a communication unit, connected to the processing unit, for outputting or receiving a note file corresponding to the electronic book, wherein the note file includes at least one note layer and the note layer includes at least one auxiliary annotation associated with content of the electronic page;
  wherein the processing unit compares an identification information of the note file according to the book information, so as to determine whether the note file corresponds to the electronic book, and outputs the note layer of the note file received from the communication unit to the user interface and stacks the note layer above the electronic page, wherein the note layer is independent of the electronic page;
  wherein the processing unit stacks a plurality of note layers above the electronic page sequentially when having the plurality of note layers displayed on the electronic reader, each of the plurality of the note layers is independent of the electronic page and each of the plurality of the note layers is independent of each other.

12. The electronic reader according to claim 11, wherein when the note file includes the plurality of note layers, the processing unit generates and outputs a note list to the user interface according to an identification name of each of the plurality of note layers.

13. The electronic reader according to claim 12, wherein the processing unit identifies at least one of the identification name selected from the note list, and displays the note layer corresponding to the selected identification name on the user interface and stacks the note layer above the electronic page.

14. The electronic reader according to claim 13, wherein the processing unit reads a size information of the note layer which is going to be displayed on the user interface for comparing the display configuration information and adjusts the note layer in proportion so that a display size of the not layer fits in with the display configuration information.

15. The electronic reader according to claim 11, further comprises:
  an input unit, connected to the processing unit and the user interface, wherein the input unit receives an input command for controlling a display mode of the note layer displaying on a top-level of the user interface;
  wherein the processing unit scales a display size of the note layer, moves a display position of the auxiliary annotation on the note layer, adds a new auxiliary annotation, or hides the note layer according to the input command.

16. The electronic reader according to claim 11, wherein the book information includes a plurality of book items with a first amount and the identification information includes a plurality of identification items, and the processing unit compares the plurality of book items with the plurality of identification items, wherein when a second amount of the identification items included in the identification information fits in with the plurality of book items and the first amount and the second amount are both larger than one and the first amount is larger than or equal to the second amount, the processing unit determines the note file corresponds to the electronic book.

17. The electronic reader according to claim 11, wherein the communication unit is a network communication unit or a short-range communication unit.

18. The electronic reader according to claim 13, wherein when the same content of the electronic page is associated with respective auxiliary annotations in different note layers displaying on the user interface, the processing unit adjusts a displaying position of the auxiliary;annotations associated with the same content.

19. A computer readable storage medium, storing a set of code, wherein when the set of code is read by the processing unit, the processing unit executes with the method according to claim 1.

* * * * *